Nov. 12, 1963    B. R. G. GUIBERT    3,110,658
DEVICES FOR SECURING FUEL ELEMENTS IN TUBULAR METAL
CASINGS FOR USE IN NUCLEAR REACTORS
Filed Nov. 14, 1960    2 Sheets-Sheet 1

Nov. 12, 1963  B. R. G. GUIBERT  3,110,658
DEVICES FOR SECURING FUEL ELEMENTS IN TUBULAR METAL
CASINGS FOR USE IN NUCLEAR REACTORS
Filed Nov. 14, 1960  2 Sheets-Sheet 2
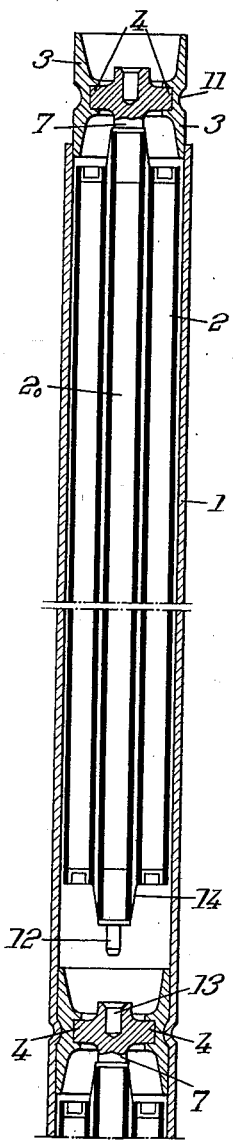
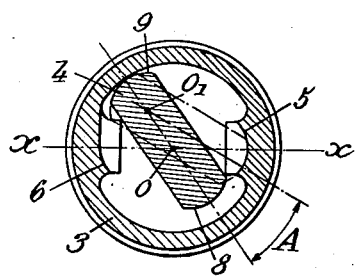
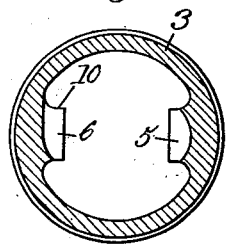
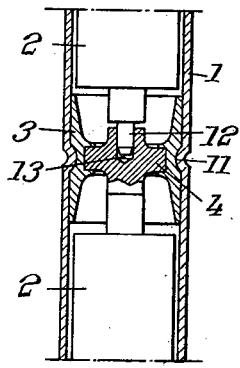
INVENTOR
BY
ATTORNEY United States Patent Office 3,110,658
Patented Nov. 12, 1963

3,110,658
DEVICES FOR SECURING FUEL ELEMENTS IN TUBULAR METAL CASINGS FOR USE IN NUCLEAR REACTORS
Bertrand Roger Georges Guibert, Paris, France, assignor to Commissariat a l'Energie Atomique, Paris, France, an organization of France
Filed Nov. 14, 1960, Ser. No. 68,740
Claims priority, application France Nov. 18, 1959
2 Claims. (Cl. 204—193.2)

The present invention relates to methods and devices for securing fuel elements in nuclear reactor tubular casings.

The object of this invention is to provide methods and devices of this kind which permit of complying with the various requirements of practice, in particular concerning quick mounting, good centering and good fluid tightness.

According to this invention, the method consists essentially in securing the fuel elements in each tubular casing by means of rings adapted to bear against the inner wall of said casing and mounted at the ends of said elements through locking or wedging means arranged in such manner that, when the rings are engaged, centered and fixed in the tubular casing, unlocking or unwedging is impossible.

A preferred embodiment of the present invention will be hereinafter described with reference to the accompanying drawings, given merely by way of example and in which:

FIG. 4 is a view analogous to FIG. 1 but showing a fuel element as it is being introduced into the tubular casing.

FIG. 5 is a view analogous to FIG. 3 illustrating how a ring is mounted on a key member fixed to a fuel element.

FIG. 6 separately shows one of the rings used according to this invention.

Figure 1:
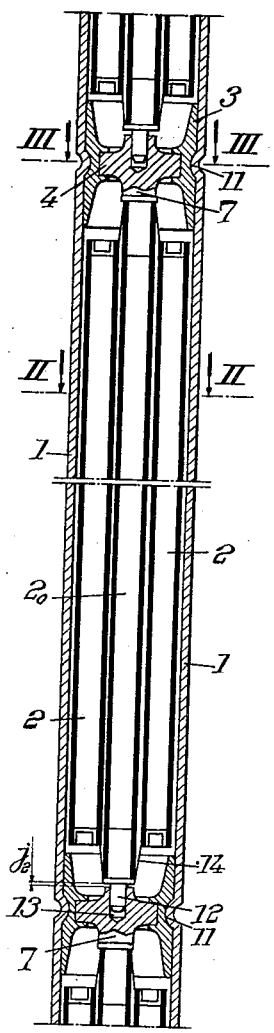
FIG. 1 is an axial sectional view of a nuclear reactor tubular casing and of fuel elements secured in said channel according to the invention.

FIG. 7 shows a system according to that illustrated in FIG. 1 but corresponding to a modification.

The nuclear reactor comprises tubular metal casings 1 intended to receive fuel elements 2. These fuel elements may be of any suitable type. In the embodiments of FIGS. 1 to 6, they consist of a plurality of tubular jackets assembled together whereas in the embodiment of FIG. 7, there is only one single container in which the fissionable material is placed.

Generally a fluid flows along the fuel elements, this fluid being for instance a gaseous or liquid moderator.

Up to now, the mounting of fuel elements in the casings of a reactor channel generally included cooperating pieces assembled through screws, bolts or rivets the fixation of which made it necessary to pierce holes in the walls of the casings, thus impairing fluid tightness thereof.

According to the present invention, the fixation of fuel elements 2 in a tubular casing 1 is obtained by means of rings 3 adapted to fit against the inner wall of said casing 1.

To lock or wedge a ring 3 on one end of a fuel element 2, use is made of a key member 4 fixed to said end of the fuel element. This member 4 is adapted to be inserted in ring 3 transversely thereto and to penetrate into housings 5, 6 (FIG. 6) suitably provided in the inner wall of ring 3. Such an engagement requires relative rotation of the ring with respect to the key (fixed in alignment with the fuel element) about eccentric axes.

Figure 2:
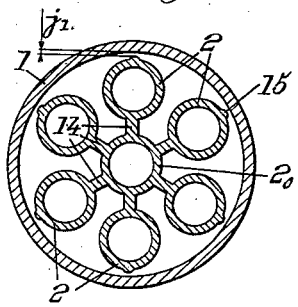
FIG. 2 is a cross sectional view on the line II—II of FIG. 1
Figure 3:
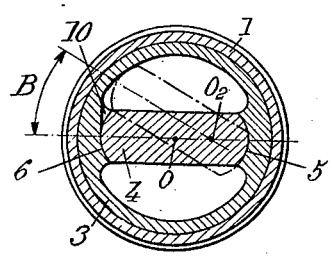
FIG. 3 is a cross sectional view on the line III—III of FIG. 1.

Key member 4 is in the form of a kind of bar having an axial extension 7 welded to the fuel jacket 2 (FIG. 7) or, in the construction of FIGS. 1 to 6, to the central tube 20 of a set of tubes 2 which constitute fuel jacket elements. The ends 8, 9 of the bar forming the essential part of key member 4 have rounded shapes (FIGS. 3 and 5).

The housings 5, 6 provided in the inner wall of ring 3 are such that one of them, 5, corresponds to the rounded shape of the end 8 of member 4 whereas the other one 6 has a lateral clearance at 10.

The outer surface of ring 3 is a cylindrical surface of a diameter corresponding, with the provision of a small play, to that of the inner cylindrical surface of casing 1. Said outer wall of ring 3 is provided with an annular groove 11.

The fixation of a ring 3 on the end of a fuel element takes place as illustrated by FIGS. 5 and 3. Initially, as shown by FIG. 5, key member 4 is located obliquely to the axis $x$—$x$ along which housings 5 and 6 are disposed. A relative rotation movement of key member 4 and ring 3 is then effected about an axis $O_1$ so as to cause the end 8 of key member 4 to penetrate into housing 5, whereas the other end 9 of said member 4 slides on the inner wall of the ring adjacent to housing 6. This movement of rotation is shown in FIG. 5 by angle A. This first movement of rotation is then followed by a second movement of rotation, in the same direction about an axis $O_2$ (FIG. 3) also eccentric and located close to housing 5. After this second rotation corresponding to angle B, the end 9 of key member 4 is brought into housing 6 (FIG. 3).

The mounting of ring 3 on the corresponding end of the fuel element 2 is then obtained, said ring being now coaxial with the fuel element. The whole of the ring and the fuel element is then inserted into tubular casing 1, where it fits in the position it must occupy. It should be noted that only one ring is provided on every fuel element at one end thereof and that the respective fuel elements are suitably centered with respect to one another by engagement of a projection 12 of each of them in a central housing 13 of the key member of the next fuel element.

The respective cartridges are mounted above one another as shown by FIG. 1 and then fixed with respect to casing 1 by crimping of the wall thereof into the respective grooves 11 of said fuel elements.

Advantageously, a radial play $j_1$ is provided between the fuel elements 2 and the inner wall of casing 1. An axial play $j_2$ is further provided between two successive fuel elements to permit expansion.

The fuel elements of FIGS. 1 to 6 include a plurality of parallel tubes 2 connected together by radical walls 14 as shown in particular by FIG. 2. Furthermore, ribs or fins 15 may be provided on the walls of tubes 2. In the construction of FIG. 7, the fuel element is a cylindrical container.

The metals used to make ring 3, casing 1 and the fuel containers 2 are those used in the art of nuclear reactor, and in particular aluminium.

The advantages of such as device are as follows:
Assembly is effected quickly in view of the absence of screws, bolts, rivets or the like;

Locking or wedging is safe since ring 3 cannot be separated from the corresponding fuel element 2 once they are both fitted in casing 1.

The construction of FIGS. 1 to 6 is well adapted to the case of a heavy water reactor, heavy water circulating both on the inside and on the outside of casing 1 but of course such a construction might be used in reactors of another type.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended witthin the scope of the accompanying claims.

What I claim is:

1. A unit for use in a nuclear reactor which comprises a tubular metal casing, a fuel element having an axis of symmetry and dimensioned to fit in said casing, which comprises a key member fixed to one end of said fuel element, said key member having an axis of symmetry in coincidence with the axis of symmetry of said fuel element, and a ring having an outer surface in the form of a circular cylinder dimensioned to fit in said casing, the outer wall of said key member and the inner wall of said ring having respective cooperating surfaces adapted to slide on each other to bring said ring and key member, by relative rotation about at least one axis parallel to but distant from the respective axes of symmetry of said ring and said key member, from a relative position where said ring is out of alignment with said fuel element to a relative position where said ring and said fuel element are coaxial, said ring and said fuel element assembled in said last mentioned position being located in said metal casing, with said ring outer wall fitting against the inner wall of said casing.

2. A device according to claim 1 in which the outer surface of said ring is provided with an annular groove, the wall of said tubular casing being crimped into said groove.

References Cited in the file of this patent

FOREIGN PATENTS

| | | |
|---|---|---|
| 216,588 | Australia | Aug. 8, 1958 |
| 220,648 | Australia | Feb. 23, 1959 |
| 784,890 | Great Britain | Oct. 16, 1957 |